(12) United States Patent
Gremling

(10) Patent No.: US 10,041,269 B2
(45) Date of Patent: Aug. 7, 2018

(54) WIND TURBINE TOWER SECTION, WIND TURBINE TOWER AND ASSEMBLY METHOD

(71) Applicant: ArcelorMittal, Luxembourg (LU)

(72) Inventor: Michaël Gremling, Seraing (BE)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 15/563,615

(22) PCT Filed: Apr. 2, 2015

(86) PCT No.: PCT/IB2015/052440
§ 371 (c)(1),
(2) Date: Oct. 2, 2017

(87) PCT Pub. No.: WO2016/156925
PCT Pub. Date: Oct. 6, 2016

(65) Prior Publication Data
US 2018/0087287 A1     Mar. 29, 2018

(51) Int. Cl.
*E04H 12/34* (2006.01)
*E04H 12/08* (2006.01)
*F03D 13/20* (2016.01)

(52) U.S. Cl.
CPC ........... *E04H 12/342* (2013.01); *E04H 12/08* (2013.01); *F03D 13/20* (2016.05); *F05B 2230/60* (2013.01); *F05B 2240/912* (2013.01)

(58) Field of Classification Search
CPC ..... E04H 12/342; E04H 12/08; E04H 12/085; F03D 13/20; F05B 2230/60; F05B 2240/912

USPC ........ 52/651.01, 655.1, 651.07, 651.09, 836, 52/843–845, 848, 745.09; 416/DIG. 6; 428/586; 138/156, 165, 157, 158, 159
See application file for complete search history.

(56) References Cited

U.S. PATENT DOCUMENTS 3,936,206 A * 2/1976 Meisberger ............. E04H 12/08
403/334
6,957,518 B1 * 10/2005 Koch, Jr. .................. E04C 3/30
248/300
(Continued)

FOREIGN PATENT DOCUMENTS

DE    102007039957 A1   2/2009
EP       2006471 A1   12/2008
(Continued)

*Primary Examiner* — Brent W Herring
(74) *Attorney, Agent, or Firm* — Davidson, Davidson & Kappel, LLC

(57) ABSTRACT

The present invention provides a tower section for a wind turbine which includes at least two tower elements stacked and arranged edge-to-edge at a joining plane, each tower element includes at least two wall segments, connected to one another by first connectors. The tower section further includes second connectors each extending astride the two adjacent tower elements along the longitudinal direction. Each second connector extends in the longitudinal extension of a first connector and has a width increasing, from the first connector, from a first width substantially equal to the width of the first connector to a second width strictly larger than the first width, the second width being reached before the joining plane starting from the first connector.

16 Claims, 7 Drawing Sheets

(56) References Cited

U.S. PATENT DOCUMENTS

| | | | | |
|---|---|---|---|---|
| 7,116,282 B2* | 10/2006 | Trankina | | E04H 12/2292 52/845 |
| 7,387,497 B2* | 6/2008 | Cone | | E04H 12/085 248/186.1 |
| 7,694,476 B2* | 4/2010 | Cook | | E04H 12/085 248/346.01 |
| 7,905,069 B1* | 3/2011 | Lockwood | | E04H 12/08 52/152 |
| 8,196,358 B2* | 6/2012 | Shiraishi | | E04H 12/085 52/40 |
| 8,281,547 B2* | 10/2012 | Hettick | | B29C 70/30 52/745.17 |
| 8,316,615 B2* | 11/2012 | Haridasu | | E04H 12/085 52/745.17 |
| 8,522,502 B2* | 9/2013 | Huesemann | | E04H 12/08 52/263 |
| 8,590,276 B2* | 11/2013 | Kryger | | E04H 12/085 403/334 |
| 9,249,597 B2* | 2/2016 | Stiesdal | | E04H 12/34 |
| 2005/0129504 A1* | 6/2005 | De Roest | | E04H 12/085 415/4.2 |
| 2006/0272244 A1* | 12/2006 | Jensen | | E04H 12/085 52/223.5 |
| 2008/0041009 A1* | 2/2008 | Cairo | | E04H 12/08 52/651.07 |
| 2008/0256892 A1* | 10/2008 | Franke | | E04H 12/08 52/655.1 |
| 2009/0021019 A1* | 1/2009 | Thomsen | | E04H 12/08 290/55 |
| 2009/0217618 A1* | 9/2009 | Cook | | E04H 12/085 52/844 |
| 2010/0071275 A1* | 3/2010 | Mathai | | E04H 12/08 52/40 |
| 2010/0319276 A1 | 12/2010 | Kryger et al. | | |
| 2011/0061332 A1* | 3/2011 | Hettick | | B29C 70/30 52/651.07 |
| 2011/0094180 A1 | 4/2011 | Huesemann | | |
| 2011/0138729 A1* | 6/2011 | Shiraishi | | E04H 12/085 52/651.01 |
| 2013/0104489 A1* | 5/2013 | Stiesdal | | E04H 12/34 52/651.01 |
| 2013/0212972 A1* | 8/2013 | Kawabata | | E04H 12/085 52/651.01 |
| 2017/0122292 A1* | 5/2017 | Michel | | F03D 13/20 |

FOREIGN PATENT DOCUMENTS

| | | | |
|---|---|---|---|
| EP | 24444571 A1 | 4/2012 | |
| JP | 2008045395 A | * 2/2008 | ............ E04H 12/08 |
| JP | 2012149643 A | * 8/2012 | ........... E04H 12/085 |

\* cited by examiner

WIND TURBINE TOWER SECTION, WIND TURBINE TOWER AND ASSEMBLY METHOD

The present invention relates to a tower section for a wind turbine having a longitudinal central axis extending along a longitudinal direction, the tower section comprising at least two tubular tower elements stacked along the longitudinal direction and arranged edge-to-edge on a joining plane, each tower element comprising at least two wall segments, connected to one another by first connectors extending along longitudinal edges of the wall segments, the tower section further comprising second connectors each extending astride the two adjacent tower elements along the longitudinal direction.

BACKGROUND

Efforts to improve the energy efficiency of wind turbines have led, over time, to an increased size of the turbines, requiring towers with an increased height and diameter to support them. Due to their large dimensions, such towers cannot be transported assembled. Consequently, the towers are generally transported in portions to their installation site, before being assembled in situ.

More particularly, methods exist for assembling wind turbine towers, according to which wall segments of the wind turbine are transported to the installation site of the wind turbine, then these wall segments are assembled using first connectors to form substantially tubular tower elements, generally cylindrical or frustoconical, which are next successively assembled to one another using second connectors to form the wind turbine tower.

In light of the increasingly large dimensions of wind turbines, it is necessary to improve the mechanical strength of these towers so as to minimize the risk of failure during use, in particular by buckling, while limiting the production costs and the assembly time as much as possible.

SUMMARY OF THE INVENTION

One aim of the invention is to provide a wind turbine tower, possibly of great height, having an increased lifetime and able to be transported easily and quickly and assembled at a lower cost.

The present invention provides a wind turbine tower section in which each second connector extends in the longitudinal extension of a first connector, the second connector having a width increasing, from said first connector, from a first width substantially equal to the width of the first connector to a second width strictly larger than the first width, the second width being reached before the joining plane starting from the first connector.

According to specific embodiments, the tower section includes one or more of the following features, considered alone or according to any technically possible combination(s):

- the tower section has a tubular shape with a polygonal cross-section, each side of this polygon defining a facet of the tower section;
- each second connector extends over a facet of the tower section and the second width is greater than or equal to 50% of the width of the facet on which the considered second connector extends, taken at the joining plane between the adjacent tower elements;
- each wall segment comprises a central panel and two side panels forming an angle with the central part;
- the second connectors are symmetrical relative to the longitudinal axis of the first connector that they extend;
- the width of the second connector increases linearly from the first width to the second width;
- each second connector comprises a substantially rectangular central portion extending astride the two adjacent wall elements and at least one trapezoidal joining portion, extending from a first respective connector to the central portion, the width of the joining portion varying, from the first connector, from the first width to the second width;
- the edges of the trapezoid of the or each trapezoidal joining portion form an angle comprised between 30 and 55° with the base of the trapezoid;
- the second connector comprises two joining portions framing the central portion along the longitudinal direction;
- each second connector is symmetrical relative to the joining plane;
- the longitudinal edges of a wall segment of the upper tower element are situated in the extension of the longitudinal edges of the adjacent wall segment of the lower tower element;
- the adjacent tower elements are regularly offset from one another, and each second connector extends on the one hand astride two circumferentially adjacent side panels of one of the tower elements and on the other hand on the central panel of the other tower element;
- the tower section further comprises intermediate connectors arranged astride two adjacent tower elements, between two circumferentially adjacent second connectors;
- each intermediate connector extends astride two longitudinally adjacent central panels of the two tower elements and each second connector extends astride two circumferentially adjacent side panels of each of the adjacent tower elements.

The present invention also provides a wind turbine tower comprising a tower section as previously described.

The present invention further provides a method for assembling a tower section as previously described, comprising:

- providing wall segments and assembling these wall segments to one another via first connectors so as to form tower elements;
- stacking, along the longitudinal direction, two tower elements and connecting these two tower elements to one another using second connectors.

BRIEF DESCRIPTION OF THE DRAWINGS

The present invention will be better understood upon reading the following description, provided solely as an example and done in reference to the appended drawings, in which.

DETAILED DESCRIPTION

Throughout the description, "connection" refers to mechanical fastening by a connecting member, and in particular fastening by bolting or screwing. This term in particular therefore does not, however, cover fastening by welding or soldering.

The use of bolts or screws to produce the connections allows optimal management of the fatigue behavior of the tower section by choosing the locations and density of the bolts or screws based on strength and fatigue endurance imperatives. Furthermore, the absence of welds within the tower section and the wind turbine tower makes it possible to avoid the presence of thermally affected areas, which guarantees homogeneity of the performance of the steels and eliminates the weak spots created by these thermally affected areas.

"Height" refers to the dimension of an element along the longitudinal direction, and "width" refers to the dimension of this element perpendicular to the longitudinal direction.

Throughout the description, "longitudinal edges" of an element refer to the edges of this element extending along the longitudinal direction. "Transverse edges" refer to the edges of this element extending perpendicular to the longitudinal direction.

The terms "top" and "bottom", "below" and "above", and "lower" and "upper" are used relative to the normal orientation of the wind turbine tower 2 on its installation site.

Throughout the description, "angular offset" refers to the rotation of a component element of the tower along the central longitudinal axis L compared to an adjacent element.

Throughout the description, the component elements of the tower, the tower section and the tower elements are preferably made from metal, in particular steel, and more particularly steel coils or plates.

The tower section 1 for a wind turbine according to the invention is intended to form part of a tower 2 of a wind turbine 3.

Figure 1:
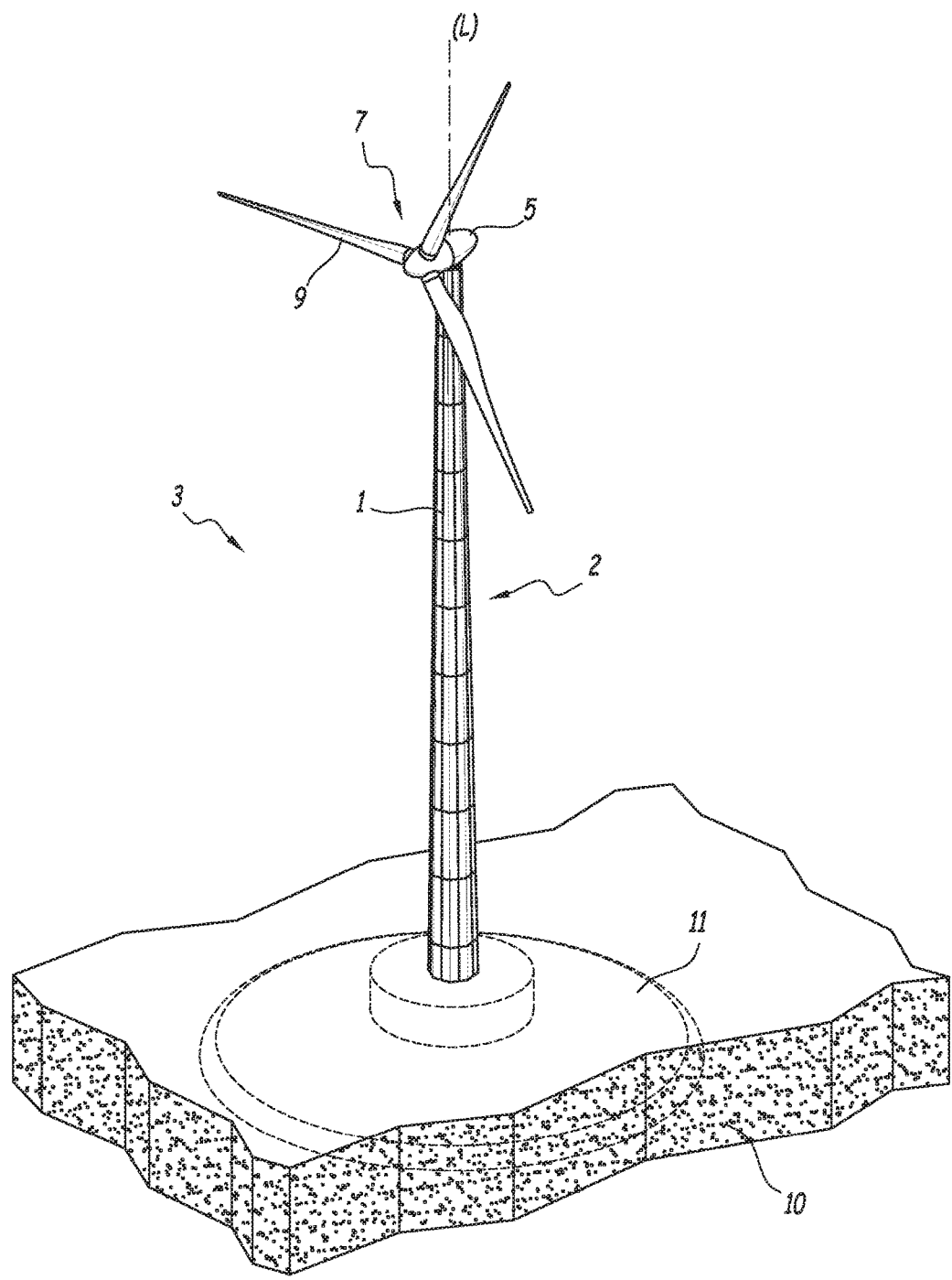
FIG. 1 is a schematic view of a wind turbine.

Conventionally, and as illustrated in FIG. 1, the wind turbine 3 comprises, at its upper end, and nacelle 5 and a rotor 7 mounted on the nacelle 5. The nacelle 5, mounted at the upper end of the tower 2, houses mechanical, electrical and electronic components for the operation of the wind turbine 3. The rotor 7 comprises a plurality of blades 9 intended to be rotated around an axis of the rotor 5 by the energy of the wind. At its lower end, the wind turbine tower 2 is intended to be anchored in the ground 10 of the installation site, by any means known by those skilled in the art, in particular by suitable foundations 11.

The tower section 1 according to the invention has a tubular shape with a central longitudinal axis L extending along a longitudinal direction. When the tower section 1 is installed on its installation site, the longitudinal direction extends along the vertical of the installation site.

In the examples illustrated in the figures, the tower section 1 has a frustoconical shape, becoming narrower toward the top of the tower 2.

"Cone" refers to any adjusted surface defined by a generatrix passing through an apex and a variable point describing a guide curve.

As an example, the tower section 1 has an outer diameter of about 7 to 11 meters, and for example equal to 9 meters, at its lower end, and about 2 to 4 meters, and for example about 4 meters, at its upper end. These diameters may, however, be adapted based on strength imperatives, the connection to the nacelle or connected to the installation site.

The tower section 1 preferably has a polygonal cross-section. Each side of this polygon defines a facet of the wall of the tower section 1.

A polygonal frustoconical shape has the advantage of best approaching the frustoconical shape with a circular base, which is the shape with the best wind resistance irrespective of the orientation thereof and the best inertia, while being very easy to manufacture, since it may in particular be made from wall segments obtained by simple bending or profiling of metal sheets.

According to one alternative, the tower section 1 has a cylindrical shape with a polygonal base having a constant cross-section.

Figure 2:
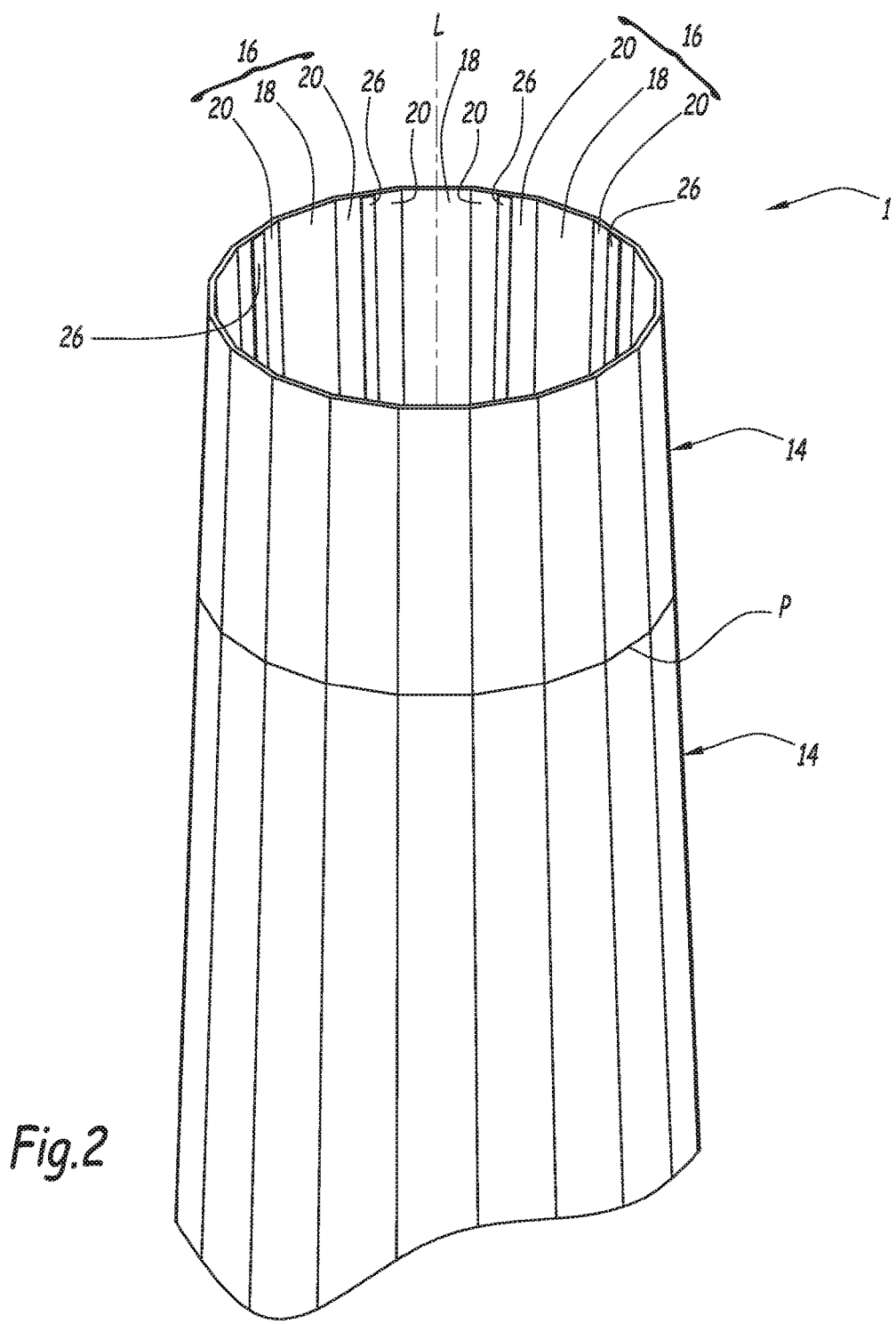
FIG. 2 is a schematic perspective view of part of a wind turbine tower section.

As illustrated in FIG. 2, the tower section 1 comprises at least two tower elements 14, stacked along the longitudinal direction. The adjacent tower elements 14 of the tower section 1 are arranged edge to edge, along a joining plane P, with the play necessary for assembly.

Each tower element 14 has a tubular shape, with a central longitudinal axis combined with the central longitudinal axis L of the tower section 1. It has a general shape similar to that of the tower section 1.

In the illustrated examples, the tower element 14 has a frustoconical shape, preferably with a polygonal base, becoming narrower toward the top of the tower element 14.

When the tower section 1 has a cylindrical shape with a polygonal base, the tower element 14 also has a cylindrical shape with a polygonal base.

Each tower element 14 comprises a plurality of wall segments 16 connected to one another by their longitudinal edges. The adjacent wall segments 16 of a tower element 14 are arranged edge to edge, along a joining line, with the play necessary for assembly.

The fact that the tower elements 14 are formed from a plurality of wall segments 16 connected to one another avoids being limited by transport regarding the final diameter of the tower element 14. Indeed, the wall segments 16 are relatively compact and can therefore be transported by standard trucks. They can next be assembled directly on the installation site to obtain tower elements 14 having the desired diameter.

Furthermore, the design based on the assembly of small elements makes it possible to conduct transport with compact and light vehicles, which makes it possible to consider new installation sites that were not possible until now, as they are difficult to access by vehicle for heavy transport vehicles, such as so-called exceptional transport.

For example, the thickness of the wall segments 16 varies as a function of their position along the tower 2, decreasing from the base toward the apex of the tower 2. The wall segments 16 for example have a thickness equal to 30 mm at the base of the tower 2 and 16 mm at the apex of the tower 2.

In the example shown in FIG. 2, each wall segment 16 comprises a central panel 18 and two side panels 20. Each side panel 20 extends from a respective longitudinal edge of the central panel 18, forming an obtuse angle with the central panel 18. The side panels 20 stiffen the wall segments 16 and increase the resistance of said segments 16 to bending along the longitudinal direction. This type of wall segment 16 also has the advantage of being easily obtained by simple bending of a metal sheet.

The joining of the adjacent side panels 20 of two adjacent wall segments 16 of a tower element 14 forms a facet of the tower element 14. Each central panel 18 of a wall segment 16 also forms a facet of the tower element 14.

Each facet of the associated tower section 1 then corresponds to the joining of the longitudinally adjacent facets of the stacked tower elements 14.

The wall segments 16 are assembled to one another by first connectors 26 extending along the longitudinal edges of the wall segments 16. The first connectors 26 are attached on the wall segments 16. Each first connector 26 extends astride two adjacent wall segments 16 of a tower element 14. It is fastened on the adjacent side panels 20 of two adjacent wall segments 16 of the tower element 14.

Figure 3:
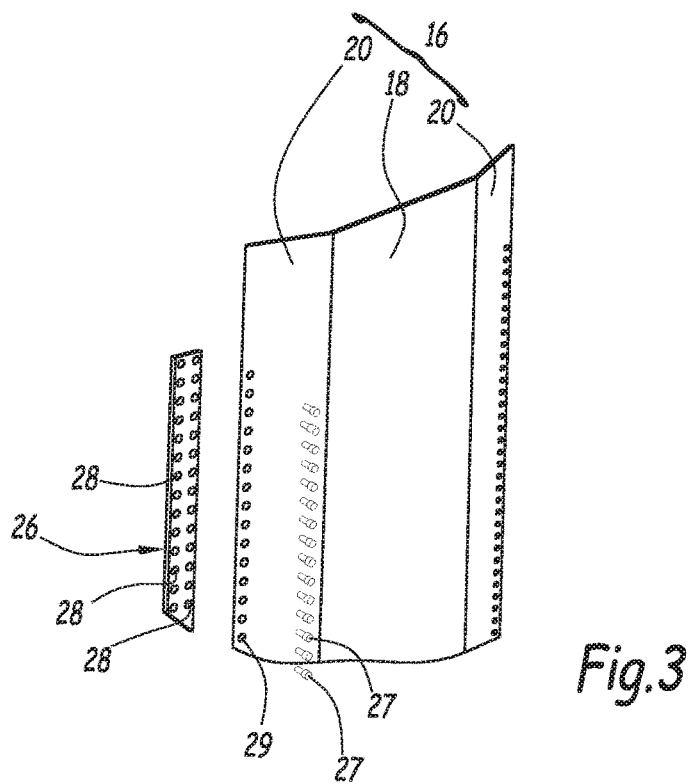
FIG. 3 is an exploded schematic perspective view of part of the wind turbine tower section of FIG. 2.

As illustrated schematically in FIG. 3, each first connector 26 is fastened on the corresponding wall segments 16 via first connecting members 27, in particular screws or bolts. To that end, the first connectors 26 comprise connecting orifices 28 intended to receive the first connection members 27. These connection orifices 28 are organized in rows. The wall segments 16 also comprise connection orifices 29 organized in a grid corresponding to that of the connection orifices 28 of the first connectors 26.

In order to simplify the drawings, the first connection members 27 and the connection orifices 28, 29 are only shown in some of the figures.

The first connectors 26 are planar. They are advantageously made by simple cutting from a steel sheet.

The first connectors 26 are arranged inside the tower section 1.

Preferably, each first connector 26 extends over the majority of the height of the tower element 14. Advantageously, it extends over 60% of the height of the tower element 14, and more particularly over at least 80% of the height of the tower element 14. This configuration makes it possible to improve the transmission of forces within the tower section 1.

Each tower element 14 may comprise a single first connector 26 extending over substantially the entire height of the tower element 14 or several first connectors 26, extending in the longitudinal extension of one another and extending jointly over substantially the entire height of the tower element 14.

Preferably, the width of the first connectors 26 is constant over their entire height. In the illustrated examples, each first connector 26 has an elongated rectangular shape in the longitudinal direction.

As an example, the width of the first connectors 26 is less than or equal to 40% of the width of the wall facet of the tower element 14 formed by the connection of the side panels 20 of the two wall segments 16 of the tower element 14 using said first connector 26. More particularly, it is less than or equal to 30% of this width. This width can be adapted for each connector 26 of the tower section 1 based on the forces that the connector 26 will have to bear. Preferably, for economic and logistical reasons on the worksite, all of the first connectors 26 of the tower section 1 have the same width.

The tower section 1 further comprises connection means between two of the adjacent tower elements 14 in the longitudinal direction.

These connection means comprise second connectors 30, each extending astride two adjacent tower elements 14 in the longitudinal direction, in the longitudinal extension of a first respective connector 26. The second connectors 30 are arranged inside the tower section 1.

Figure 4:
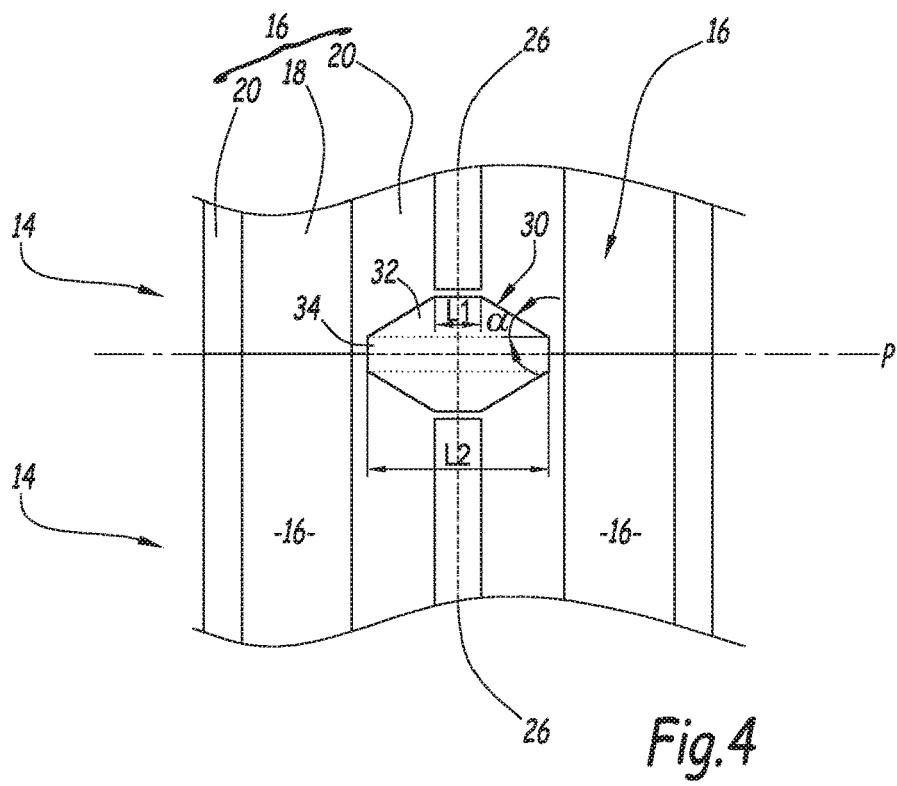
FIG. 4 is an enlarged schematic view of a joining area between two tower elements of a tower section according to the invention, from the inside of the tower, illustrating an example second connector.
Figure 5:
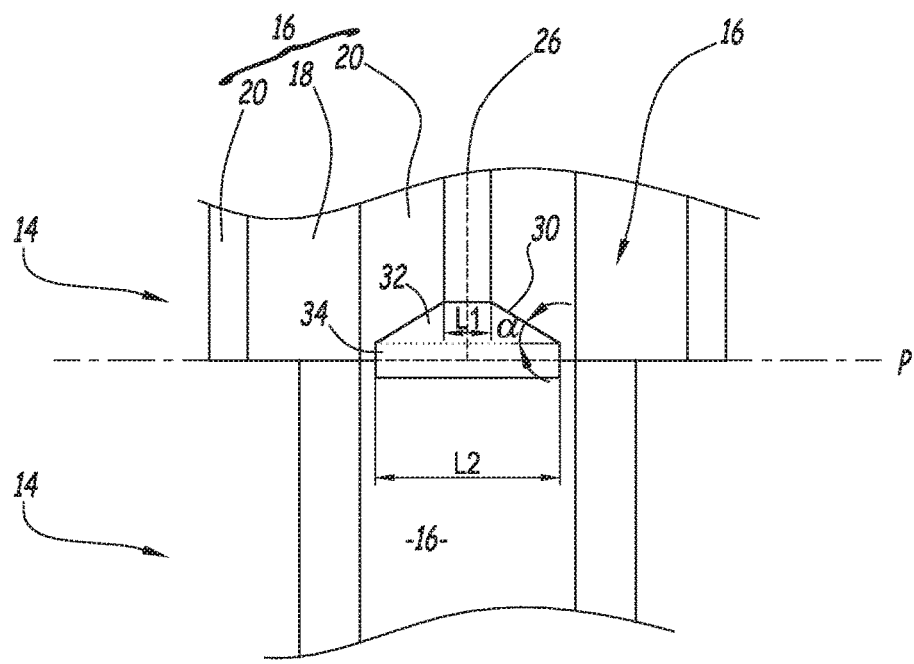
FIG. 5 is a view similar to FIG. 4, illustrating another example second connector.

FIGS. 4 and 5 illustrate examples of second connectors 30 according to the invention.

In the case of a tower section 1 having facets, each second connector 30 extends over a facet of the tower section 1, astride the longitudinally adjacent facets of the tower elements 14 connected to one another by this second connector 30.

Preferably, the second connectors 30 are symmetrical relative to a central longitudinal axis of the first connectors 26.

The second connectors 30 are substantially planar. They are made in one piece. They are advantageously obtained by simple cutting from a steel sheet.

As shown in FIGS. 4 and 5, the second connectors 30 have a variable width in the longitudinal direction. More particularly, for each second connector 30, the width increases, from the first connector 26 that it extends, and moving away therefrom, from a first width L1 substantially equal to the width of the first connector 26 to a second width L2, strictly larger than the first width.

The second width L2 is reached before the joining plane P starting from the first connector 26. The second connector 30 thus has the second width L2 on either side of the joining plane P.

This variation in the width of the two connectors 30 results in a significant reduction of the maximum stresses in the second connectors 30.

The inventors have noted that the maximum stresses in the second connectors 30 are significantly lower than if one uses second connectors with a constant width equal to the first width or the second width over the entire height. Thus, owing to the use of the second connectors 30, the tower section 1 according to the invention has an improved mechanical strength, which allows the production of very tall towers with a lower buckling risk, and thereby increases the lifetime of such towers. Furthermore, these connectors are easy to manufacture and allow a simple and inexpensive connection between tower elements 14.

The shape of the second connectors 30 is particularly useful due to the fact that the connector 30 extends astride at least three wall segments 16, comprising two circumferentially adjacent segments and at least one longitudinally adjacent segment, as illustrated in FIGS. 4 and 5. Indeed, as a result, the second connectors 30 are situated astride a longitudinal joining line between circumferentially adjacent wall segments 16 and over a transverse joining line between two longitudinally adjacent wall segments 16, and are thus stressed in rigidity multidirectionally. Yet the second connectors 30, due to their particular shape, are especially suitable for withstanding such stresses.

The height of the width portion L2 of the second connector 30 is chosen based on vertical stresses to be reacted at the junction between the two tower elements 14.

Preferably, the first width L1 of the second connector 30 is comprised between 1 time and 1.2 times the width of the first connector 26 that it extends. This makes it possible to minimize an abrupt change in rigidity at the junction of the first connector 26 and the second connector 30, which limits the stress concentration at that level. Preferably, the first width L1 is equal to the width of the first connector 26.

Preferably, the ratio of these widths L1 to L2 is comprised between 2 and 10. This optimizes the flow of stresses at the transition between two adjacent tower elements 14.

In the case of a tower section having facets, the second width L2 is smaller than or equal to the width of the facet of the tower section 1 on which the second connector 30 extends, taken at the joining plane P between the two adjacent tower elements 14.

It is advantageously greater than about 50% of the width of this facet. More particularly, it is greater than 70% of the width of this facet.

Preferably, the width of the second connectors 30 increases linearly between the first width L1, at the first connector 26, and the second width L2. This shape constitutes the best compromise between mechanical performance and production cost.

Advantageously, the second connector 30 comprises a trapezoidal joining portion 32, the width of which increases from the width L1 to the width L2 moving away from the first connector 26. This joining portion 32 is extended longitudinally, moving away from the first connector 26, by a central portion 34 with width L2. The central portion 34 extends, in particular symmetrically, astride the two adjacent tower elements 14.

Preferably, the edges of the trapezoid of the joining portion 32 form an angle α comprised between 30° and 55° with the base of the trapezoid. This improves the transmission of forces and the rigidity strength of the second connector 30. The angle α is advantageously equal to 45° for an optimal transmission of the forces between the tower elements 14 and the second connector 30.

Figure 6:
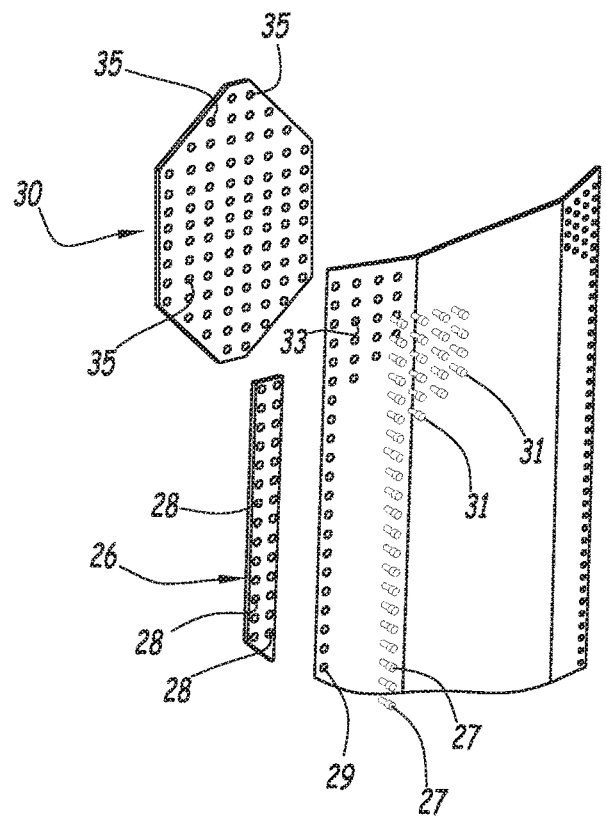
FIG. 6 is an exploded schematic perspective view of part of a tower section.

As illustrated in FIG. 6, the second connectors 30 are fastened on the tower elements 14 using second connection members 31, for example formed by screws or bolts.

As an example, each second connector 30 comprises a regular grid of connection orifices 35 intended to receive the second connection members 31. This grid is for example a grid with a rectangular mesh, and for example a square mesh. The connection orifices 35 are distributed regularly over the entire surface of the second connectors 30. The distance between adjacent connection orifices 35 is chosen so as to optimize the mechanical strength and the fatigue endurance based on the needs. The tower segments 16 also comprise a grid of connection orifices 33 coinciding with the grid of connection orifices 35 of the second connectors 30.

Advantageously, the distances between the connection orifices 28 of the first connectors 26 and between the connection orifices 35 of the second connectors 30 are identical, such that within the tower section 1, the rows of first connection members 27 extend in the extension of rows of second connection members 31.

In order to simplify the drawings, the first connection members 31 and the connection orifices 35, 33 are only shown in some of the figures.

Figure 7:
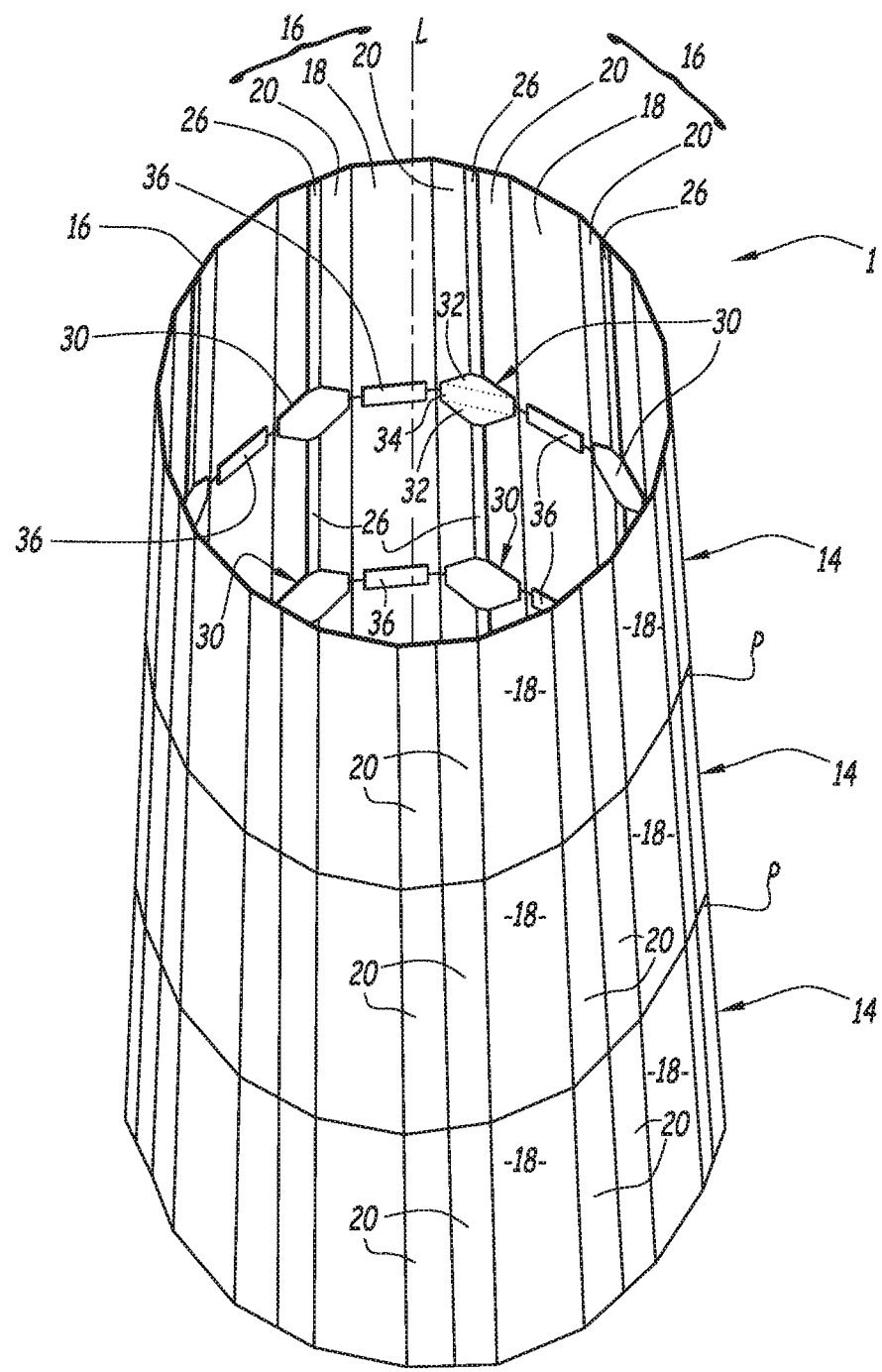
FIG. 7 is a schematic perspective view of part of a wind turbine tower section according to a first embodiment.
Figure 8:
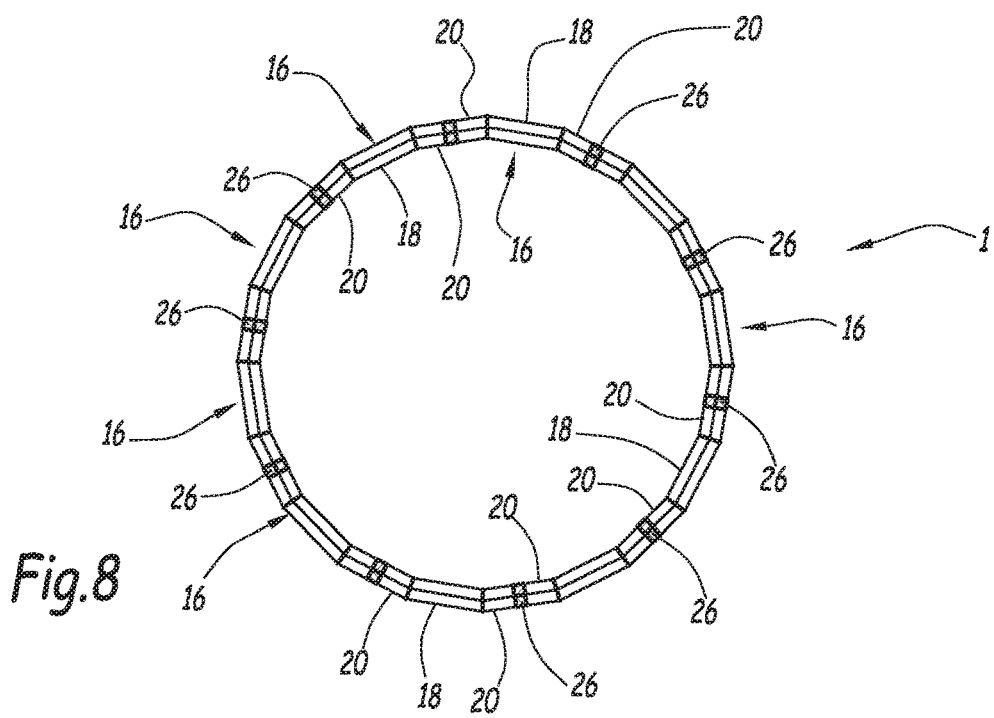
FIG. 8 is a schematic top view of the wind turbine tower section of FIG. 7.
Figure 9:
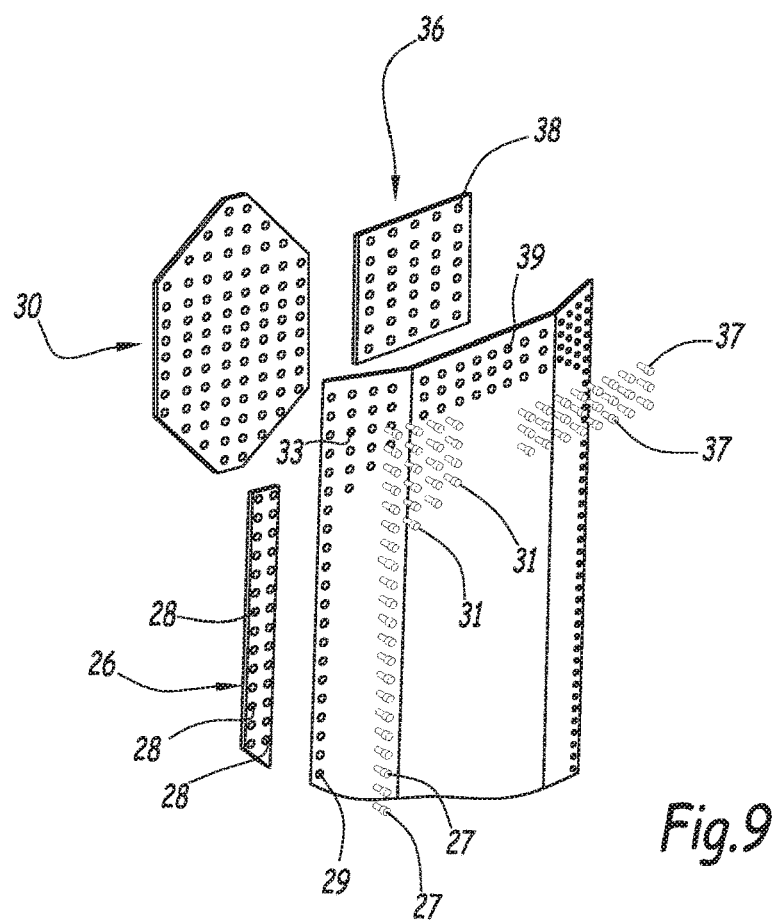
FIG. 9 is an exploded schematic perspective view of part of the wind turbine tower section of FIG. 7, only some connecting members being shown.

In reference to FIGS. 7 to 9, we will now more particularly describe a tower section 1 according to a first embodiment. This tower section 1 has all of the features previously described. It also has the more specific features described below.

In this first embodiment, all of the tower elements 14 of the tower section 1 have the same angular orientation. The longitudinal edges of a wall segment 16 of the upper tower element 14 are situated in the extension of the longitudinal edges of the adjacent wall segment 16 of the lower tower element 14. Each first connector 26 of the upper tower element 14 is arranged in the extension along the longitudinal direction of a first connector 26 of the lower tower element 14.

Each second connector 30 is inserted, in the longitudinal direction, between a first connector 26 of the upper tower element 14 and a first connector 26 of the lower tower element 14. Each second connector 30 is positioned edge to edge with the first connectors 26 that frame it, with the play necessary for assembly.

Each second connector 30 is fastened, on the one hand, on two circumferentially adjacent wall segments 16 of one of the tower elements 14, and on the other hand, on two circumferentially adjacent wall segments 16 of the other tower element 14. It is thus arranged astride four wall segments 16.

The second connectors 30 are symmetrical relative to the joining plane P between the two adjacent tower elements 14. They comprise a substantially rectangular central portion 34, with a constant width equal to the second width L2, framed, in the longitudinal direction, by two trapezoidal joining portions 32 as previously described. Thus, in this embodiment, the second connectors 30 have an octahedral contour.

As illustrated in FIG. 7, in the first embodiment, the means for connecting tower elements 14 to one another may further comprise intermediate connectors 36. The intermediate connectors 36 connect tower elements 14 to one another at central panels 18 of their wall segments 16. They extend astride the two adjacent tower elements 14 while being fastened on the central panels 18 of the wall segments 16 of these tower elements 14. They are arranged between two circumferentially adjacent second connectors 30. They extend along transverse edges of the tower elements 14.

The intermediate connectors 36 are arranged inside the tower section 1.

The intermediate connectors 36 are substantially planar. In the illustrated example, they have a rectangular contour. They extend in an elongation direction substantially perpendicular to the longitudinal direction.

The intermediate connectors 36 have a width smaller than or equal to the width of the wall facet of the tower section 1 on which they are fastened, taken at the joining plane P between these tower elements 14. This wall facet is formed by the joining of the central panels 20 of the two longitudinally adjacent wall segments 16. As an example, the intermediate connectors 36 have a width larger than or equal to 50% of the width of this wall facet, taken at the joining plane P between these tower elements 14.

The intermediate connectors 36 participate in the rigidity strength along the tower 2, and more particularly between two adjacent tower elements 14. Since they are stressed only along one line, corresponding to the intersection of the intermediate connectors 36 with the joining plane P, the issues related to rigidity variations are smaller compared to what occurs at the second connectors 30, which are situated on a joining area between four wall segments 16 and are therefore stressed in rigidity multidirectionally. Consequently, rectangular intermediate connectors 36 with a sufficient length offer a sufficient rigidity.

As illustrated in FIG. 9, the intermediate connectors 36 are fastened on the wall segments 16 via third connecting members 37, such as screws or bolts. Each intermediate connector 36 comprises a regular grid of connection orifices 38 intended to receive the third connection members 37. This grid is for example a grid with a rectangular mesh, and for example a square mesh. The connection orifices 38 are distributed regularly over the entire surface of the intermediate connectors 36. The distance between adjacent connection orifices 38 is chosen so as to optimize the mechanical strength and the fatigue endurance based on the needs.

When the tower section 1 comprises intermediate connectors 36, the tower sections 16 also comprise a grid of connection orifices 39 coinciding with the grid of connection orifices 38 of the intermediate connectors 36.

In order to simplify the drawings, the third connection members 37 and the connection orifices 38, 39 are only shown in FIG. 9.

Figure 10:
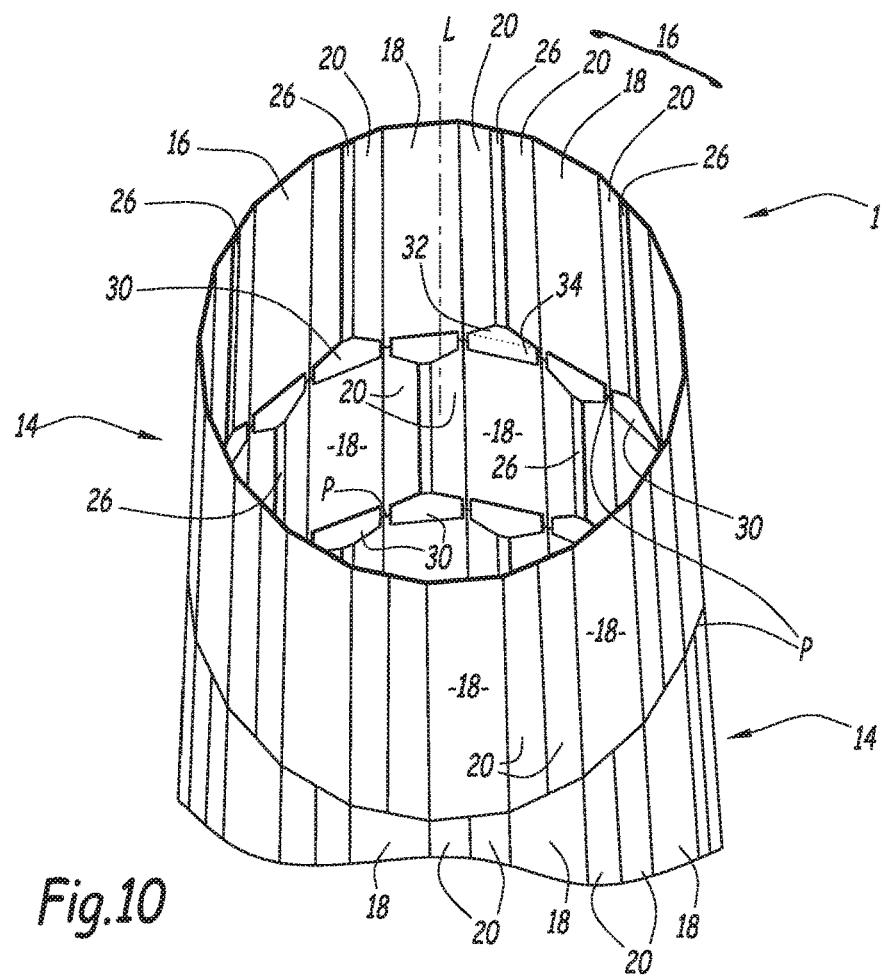
FIG. 10 is a schematic perspective view of part of a wind turbine tower section according to a second embodiment.
Figure 11:
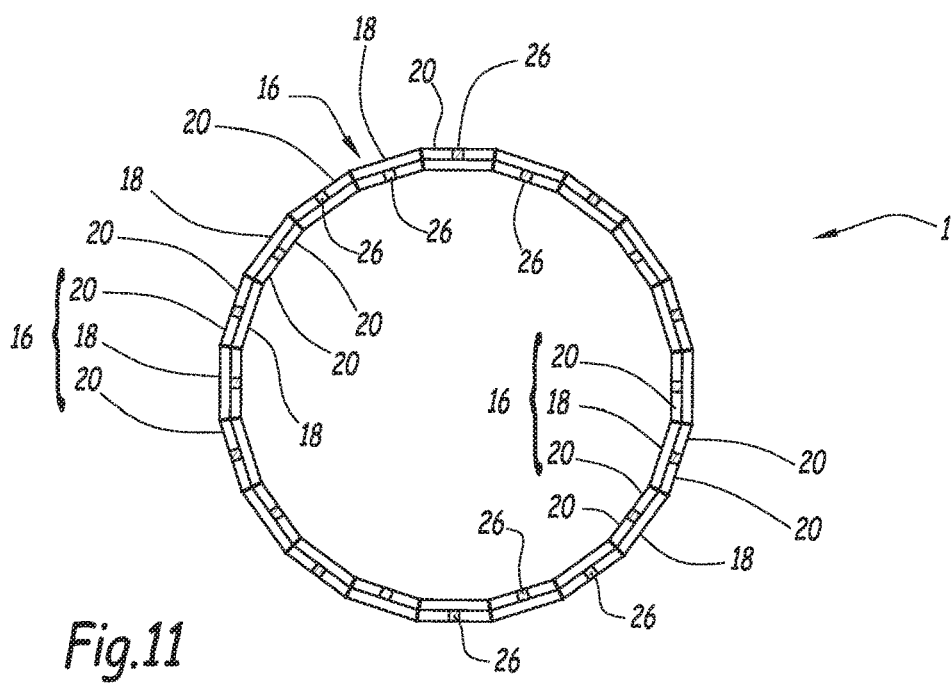
FIG. 11 is a top view of the wind turbine tower section of FIG. 10.

FIGS. 10 to 11 more particularly illustrate a tower section 1 according to a second embodiment.

This tower section 1 has all of the features previously described in light of FIGS. 1 to 6. It also has the more specific features described below.

In the second embodiment, the longitudinally adjacent tower elements 14 are angularly offset relative to one another such that the longitudinal edges of a wall segment 16 of the upper tower element 14 are not in the extension of the longitudinal edges of the longitudinally adjacent wall segment 16 of the lower tower element 14. In other words, the joining lines between circumferentially adjacent wall segments 16 of the upper tower element 14 are angularly offset relative to the joining lines between circumferentially adjacent wall segments 16 of the lower tower element 14. They do not extend in the extension of one another in the longitudinal direction.

In the case of wall segments 16 comprising a central panel 18 and two side panels 20, each central panel 18 of a wall segment 16 of the upper tower element 14 extends across, in the longitudinal direction, from two adjacent side panels 20 of the lower tower element 14.

Thus, the first connectors 26 of the upper tower element 14 are angularly offset relative to the first connectors 26 of the lower tower element 14. They do not extend in the extension of one another.

In this second embodiment, in light of the angular offset between the adjacent tower elements 14, each second connector 30 is in contact, with the play necessary for assembly, with only one first connector 26.

The second connectors 30 are not symmetrical relative to the joining plane P of the two tower elements 14. They each comprise only the central portion 34 and a single joining portion 32 as previously described, extending between the first connector 26 and the central portion 34. Thus, they do not comprise two joining portions 32 like in the first embodiment. The shape and arrangement of the central portion 34 and the single joining portion 32 of the second connector 30 are identical to those of the second connector 30 according to the first embodiment.

In the second embodiment, each second connector 30 is fastened, on the one hand, on a single wall segment 16 of one of the wall elements 14, and on the other hand, on two circumferentially adjacent wall segments 16 of the other tower element 14. It is thus arranged astride three wall segments 16.

In the case of wall segments 16 comprising a central panel 18 and two side panels 20, the second connectors 30 are fastened on the one hand on a central panel 18 of a wall segment 16 of one of the tower elements 14 and on the other hand, astride two circumferentially adjacent side panels 20 of two wall segments 16 of the other tower element 14.

In this embodiment, the tower section 1 comprises a second connector 30 on each of its facets, at the junctions between tower elements 14. At each junction between tower elements 14, the second connectors 30 are arranged head-to-tail along the circumference of the tower element 14. The joining portion 32 is thus arranged alternately above and below the central portion 34. In particular, the joining portion 32 is oriented with its tip toward the first connector 26 that it extends. It is oriented with its tip pointed upward when the second connector 30 extends the first connector 26 from the bottom, and downward when the second connector 30 extends the first connector 26 from the top.

The wind turbine tower section 1 according to this embodiment has all of the advantages of the wind turbine tower section 1 according to the first embodiment.

Furthermore, in the second embodiment, the circumferential offset of the tower elements 14 improves the mechanical strength of the tower section 1 and the tower 2 inasmuch as the joining lines between wall segments 16 of the adjacent tower elements 14, embodied by the first connectors 26, are not arranged across from one another in the longitudinal direction. Indeed, the mechanically weakest areas are thus better distributed along the circumference of the tower section 1, which further improves the mechanical strength of the wind turbine tower 2.

The invention also relates to a wind turbine tower 2 comprising at least one tower section 1 as previously described. Advantageously, the wind turbine tower 2 is formed by stacking, in the longitudinal direction, of such tower sections 1.

In the case of the second embodiment, the tower sections 1 are preferably also stacked angularly offset such that the joining lines between wall segments 16 of the lower tower element 14 of the upper section 1 are not arranged across from the joining lines between wall segments 16 of the upper tower element 14 of the lower section 1.

The invention also relates to a method for assembling a tower section 1 as previously described.

This assembly method comprises:
  providing wall segments 16 and assembling these wall segments 16 to one another via first connectors 26 so as to form tower elements 14;
  stacking, along the longitudinal direction, two tower elements 14 and connecting these two tower elements 14 to one another using second connectors 30.

According to the first embodiment, during the stacking step, the two tower elements 14 are stacked with the same angular orientation, such that each first connector 26 of the upper tower element 14 extends in the extension along the longitudinal direction of a first connector 26 of the lower tower element 14. Thus, during the step for connecting the tower elements 14 to one another, the second connectors 30 are arranged, in the longitudinal direction, between two first connectors 26, respectively belonging to the lower tower element 14 and the upper tower element 14.

According to the second embodiment, during the stacking step, the tower elements 14 are preferably also stacked angularly offset such that the joining lines between wall segments 16 of the upper tower element 14 are not in register with the joining lines between wall segments 16 of the lower tower element 14.

Digital simulations have made it possible to confirm the advantages procured by the connectors according to the invention. The most noteworthy effect of this improvement is a significant reduction of the maximum stresses in the second connectors 30 as well as the intermediate connectors 36.

For example, one of the tower configurations 1 calculated respecting the calculation codes in force shows reductions of the stresses of 8% relative to the stresses that the tower 1 would experience if the second connectors had the traditional rectangular shape.

The second connectors 30 according to the invention also allow an increase in the value of the first mode specific to the tower 2 and an increase in the overall instability resistance of about 30 MPa in terms of maximum acceptable vertical load.

Lastly, the second connectors 30 according to the invention also allow a slight increase in the resonance frequency.

The values presented above are the result of the calculation relative to a wind turbine tower 2 according to the first embodiment of the invention, having the following dimensions.

The tower 2 has a frustoconical shape, with a polygonal cross-section, and a height of 140 meters. The diameter of the tower 2 varies from 9 m at its base to 4 m at the apex. The wall segments 16 each have a height of 12 m, and a thickness comprised between 17 mm and 24 mm based on their vertical position on the tower 2, the thickness decreasing toward the apex of the tower 2.

The tower 2 comprises 20 facets, the cross-section of the tower 2 being formed by a polygon with 20 sides. The width of the facets varies from 1.4 m to 0.6 m based on the vertical position on the tower 2.

The tower 2 is provided with first rectangular connectors 26 with a width equal to 200 mm and a height varying as a function of the position on the tower 2 on average from 11.59 m for the first connectors 26 situated at the base of the tower 2 to 11.17 m for the first connectors 26 situated at the apex of the tower 2.

The second connectors 30 have an octahedral shape with a trapezoidal joining portion 32. The width L1 at the apex of the joining portion 32 is 200 mm. The angle α between the edges of the trapezoid and its base is equal to 45°. The central portion 34 is rectangular and has a width L2 going from 1.2 m at the base of the tower 2 to 0.6 m at the apex of the tower 2, based on the vertical position of the second connector 30 in question on the tower 2. The height of the central portion 34 varies, based on the vertical position of the second connector 34 in question along the tower 2, from 800 mm at the base of the tower 2 to 400 mm at the apex of the tower 2. The height of the second connectors 30 goes from 1.3 m to 0.6 m, depending on their position either at the bottom or top of the tower 2, respectively.

The intermediate connectors 36 have a rectangular shape. Their height varies, depending on their position on the tower 2, from 800 mm at the bottom of the tower 2 to 400 mm at the top of the tower 2. The width of the intermediate connectors 36 varies from 1.2 m at the base of the tower 2 to 0.6 m at the apex of the tower 2, based on the vertical position of the connector 36 on the tower 2.

In the context of this calculation, the thickness of all of the connectors 26, 30, 36 has been taken as equal to 16 mm. It will be noted that in practice, the thickness of the connectors 26, 30, 36 can reach up to 18 mm, depending on the stresses.

What is claimed is:

1. A tower section for a wind turbine having a longitudinal central axis extending along a longitudinal direction, the tower section comprising:
   at least two tubular tower elements stacked along the longitudinal direction and arranged edge-to-edge at a joining plane, each tower element comprising at least two wall segments, connected to one another by first connectors extending along longitudinal edges of the wall segments; and
   second connectors each extending astride the two adjacent tower elements along the longitudinal direction, each second connector extending in a longitudinal extension of a respective first connector, the second connector having a width increasing from the respective first connector from a first width, which is substantially equal to the width of the respective first connector, to a second width, which is larger than the first width, the second width being reached before the joining plane.

2. The tower section according to claim 1, wherein the tower section has a tubular shape with a polygonal cross-section, each side of the polygon defining a facet of the tower section.

3. The tower section according to claim 2, wherein each second connector extends over a respective facet of the tower section and the second width is greater than or equal to 50% of the width of the facet on which the second connector extends, taken at the joining plane between the adjacent tower elements.

4. The tower section according to according to claim 1, wherein each wall segment comprises a central panel and two side panels forming an angle with the central panel.

5. The tower section according to claim 4, wherein the adjacent tower elements are angularly offset from one another, and each second connector extends on the one hand astride two circumferentially adjacent side panels of one of the tower elements and on the other hand on a central panel of the other tower element.

6. The tower section according to according to claim 1, wherein the second connectors are symmetrical relative to the longitudinal axis of the first connectors from which the second connectors extend.

7. The tower section according to claim 1, wherein the width of the second connector increases linearly from the first width to the second width.

8. The tower section according to claim 7, wherein each second connector comprises a substantially rectangular central portion extending astride the two adjacent tower elements and at least one trapezoidal joining portion, extending from the respective first connector to the central portion, the width of the joining portion varying, from the first connector, from the first width to the second width.

9. The tower section according to claim 8, wherein the edges of the at least one trapezoidal joining portion form an angle comprised between 30 and 55° with the base of the trapezoidal joining portion.

10. The tower section according to according to claim 1, wherein the second connector comprises two joining portions framing a central portion along the longitudinal direction.

11. The tower section according to according to claim 1, wherein each second connector is symmetrical relative to the joining plane.

12. The tower section according to according to claim 1, wherein the longitudinal edges of a wall segment of an upper tower element are situated in the extension of the longitudinal edges of an adjacent wall segment of a lower tower element.

13. The tower section according to according to claim 1, further comprising intermediate connectors arranged astride two adjacent tower elements, between two circumferentially adjacent second connectors.

14. The tower section according to claim 13, wherein each wall segment comprises a central panel and two side panels forming an angle with the central panel and each intermediate connector extends astride two longitudinally adjacent central panels of the two tower elements and each second connector extends astride two circumferentially adjacent side panels of each of the adjacent tower elements.

15. A wind turbine tower comprising:
the tower section according to claim 1.

16. A method for assembling a tower section according to claim 1, comprising the steps of:
  providing wall segments and assembling these wall segments to one another via first connectors so as to form tower elements; and
  stacking, along the longitudinal direction, two tower elements and connecting these two tower elements to one another using second connectors.

* * * * *